United States Patent [19]
Mosser et al.

[11] Patent Number: 5,066,540
[45] Date of Patent: Nov. 19, 1991

[54] FLAKE MATERIALS IN COATING COMPOSITIONS

[75] Inventors: Mark F. Mosser, Sellersville; Kevin B. Eddinger, Gilbertsville; William J. Fabiny, Harleysville, all of Pa.

[73] Assignee: Sermatech International, Inc., Limerick, Pa.

[21] Appl. No.: 402,796

[22] Filed: Sep. 5, 1989

Related U.S. Application Data

[60] Division of Ser. No. 233,833, Aug. 16, 1988, Pat. No. 4,863,516, which is a continuation of Ser. No. 6,376, Jan. 23, 1987, abandoned.

[51] Int. Cl.$^5$ .................... B32B 15/04; B32B 5/16
[52] U.S. Cl. .................... 428/336; 106/14.12; 148/258; 428/323; 428/328; 428/457; 428/469; 428/472.3
[58] Field of Search ......... 428/328, 323, 457, 336, 428/469, 472; 106/14.12; 148/258

[56] References Cited

U.S. PATENT DOCUMENTS

| | | |
|---|---|---|
| 3,248,251 | 4/1966 | Allen .................... 428/457 X |
| 3,671,331 | 6/1972 | Malkin et al. .................... 428/656 X |
| 3,907,608 | 9/1975 | Barrett et al. .................... 428/341 X |
| 4,141,760 | 2/1979 | Baldi .................... 428/653 X |
| 4,606,967 | 8/1986 | Mosser .................... 428/220 |
| 4,617,056 | 10/1986 | Mosser et al. .................... 106/14.12 |
| 4,659,613 | 4/1987 | Mosser et al. .................... 106/14.12 |
| 4,724,172 | 2/1988 | Mosser et al. .................... 106/14.12 |
| 4,806,161 | 2/1989 | Fabiny et al. .................... 106/14.12 |
| 4,863,516 | 9/1989 | Mosser et al. .................... 106/14.12 |

Primary Examiner—George F. Lesmes
Assistant Examiner—Christopher Brown
Attorney, Agent, or Firm—Weiser & Stapler

[57] ABSTRACT

A cured coating composition and substrate coated with the cured coating composition which coating is based upon an aqueous acid binder solution containing phosphate and chromate and/or molybdate ions into which has been dispersed a blend of metallic powder particles of three primary dimensions and flat metal flake materials, which can be applied to a substrate part to be coated more uniformly and thickly than conventional metal flake coatings, and which imparts better corrosion and impact resistance than conventional powder metal coatings.

36 Claims, 6 Drawing Sheets

FLAKE MATERIALS IN COATING COMPOSITIONS

This is a divisional of U.S. application Ser. No. 233,833, filed Aug. 16, 1988, now U.S. Pat. No. 4,863,516, which is a continuation of U.S. application Ser. No. 006,376, filed Jan. 23, 1987, now abandoned.

This patent application incorporates in its entirety, the Disclosure Document Deposit (including all Figures) deposited in the United States Patent Office on Apr. 22, 1985, under Ser. No. 136,989 and it is made part hereof.

The present invention relates to coating compositions used to impart corrosion resistance to a variety of metallic articles. The coatings of the invention are also applicable to a variety of non-metals including ceramics and composite materials to provide surfaces suitable for bonding and surfaces with other modified properties.

The invention broadly described relates to aqueous compositions which comprise an aqueous acid binder which includes phosphate ions and chromate and/or molybdate ions and a powder mixture of flakes of a pigment and of a material which is not a flake, generally a metal which is three-dimensional in its primary dimension, or where the two-dimensional particle is in a smaller proportion.

The invention also provides for the coatings of such compositions and the articles coated with the composition.

The coatings and coated articles have improved properties over the conventionally coated articles.

The invention also relates to the articles coated with such compositions and to a method for coating various articles. More particularly, the invention relates to aqueous acid coating compositions containing a dissolved phosphate compound and chromate or molybdate compound and particles of flake shaped pigment along a spherical, atomized or other three-dimensional pigment.

The invention is further illustrated by the following Figures, wherein

Figure 1:
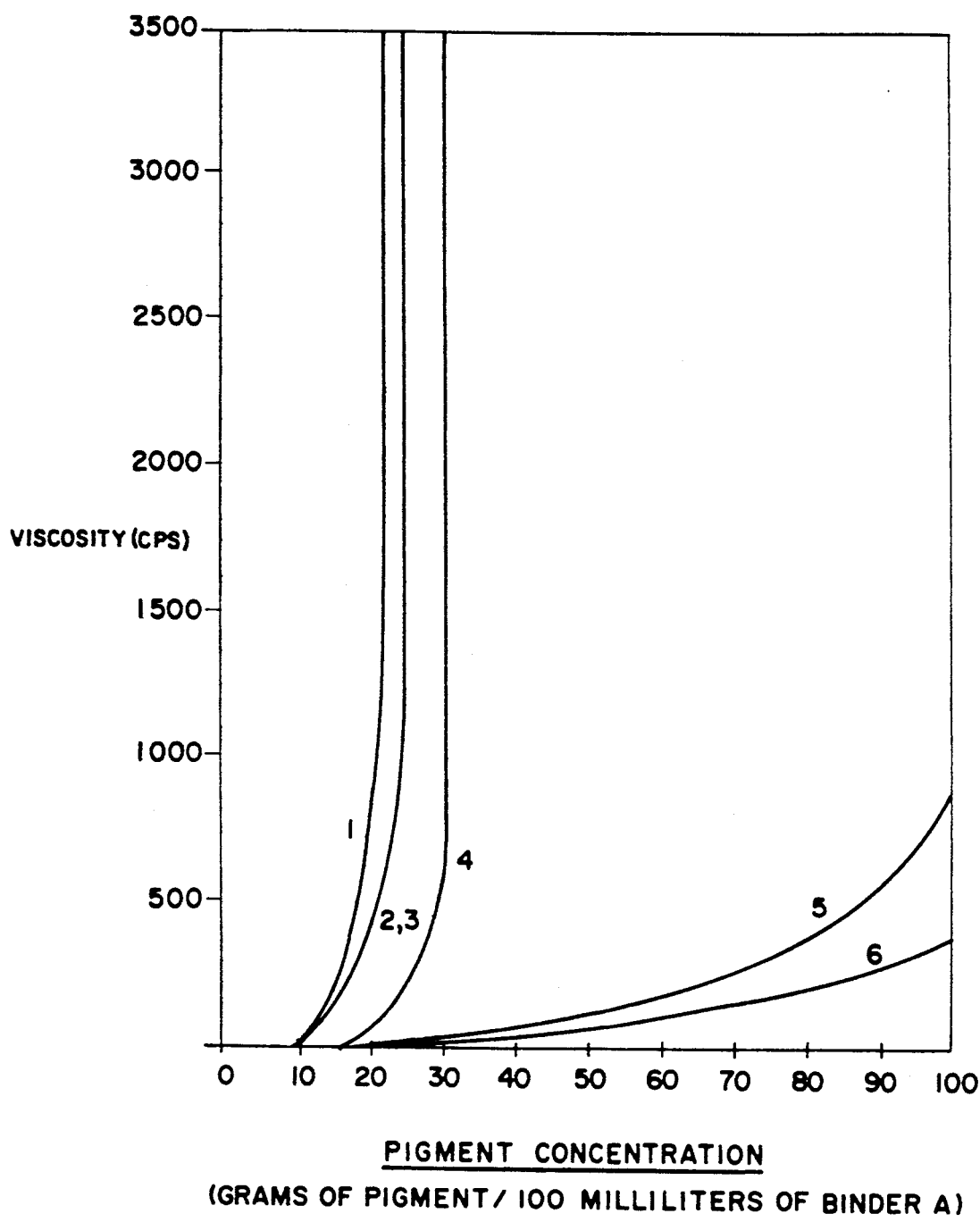
FIG. 1 is a graph showing the effect of pigment concentration on the viscosity of an acid binder in which the added pigments are aluminum flakes and atomized powders of different sizes and types.

Coating compositions are known which comprise a slurry of solid particulate material in an aqueous acidic solution containing phosphates and chromates, or molybdates. After application of such a coating to a substrate, it is heated to a temperature of about 500° F. until the coating is water insoluble. Higher or lower temperatures are often used. Such coatings often incorporate metal powders often referred to as "pigments", such as aluminum powder, as a solid particulate material so as to provide oxidation and corrosion protection to ferrous alloys. In some cases where the substrate for the coating is ferrous metal, the aluminum powder in the coating, by way of electrochemical reactions which ensue in a salt-spray or other corrosive atmosphere, generally sacrifices itself to the end that there is little or no corrosion of the ferrous metal substrate. It has further been established that the property of the sacrificiality of the coating in providing the increased corrosion protection is greatly enhanced by so processing the coating as to render it electrically conductive. Usually, the aluminum filled coatings are made sacrificial and galvanically active by either cold working (burnishing) the coating surface, or by heat treating to a temperature of about 1,000° F. for ninety minutes. Other heat treatments can be used. The goal is to produce an electrically conductive aluminum coating that is sacrificial, i.e., will corrode and protect the adjacent base metal areas from corrosion.

Sacrificial, burnished or heat treated coatings of this type are commonly used on aerospace and industrial turbine components. In other applications, burnished or heat treated coatings may be used in salt environments and/or in elevated temperatures. Examples of this type of chromate/phosphate coating are described in the patent art. One early Allen U.S. Pat. No. 3,248,251, describes heat cured dispersions comprising a solid particulate material in an aqueous solution containing substantial amounts of phosphate anion, and an anion of chromate, molybdate, and mixtures thereof, preferably all chromate, and metal ion. Specific preferred solid particulate material is listed in column 8, lines 19-44. Of preference is metal powder, aluminum powder of spherical shape and 5-10 microns average diameter being most preferred. In related disclosures, Collins uses the same pigment in aluminum filled chromate/phosphate dispersions described in U.S. Pat. Nos. 3,248,249 and 3,248,250, the improvements being methods to reduce the cure temperature of the coating.

In Brumbaugh, U.S. Pat. No. 3,869,293, use of aluminum/magnesium alloys is disclosed as a means of improving corrosion resistance. Specifically the aluminum/magnesium alloy particles and also the aluminum particles present should preferably be of generally spherical shape often referred to as "atomized powder" column 93, lines 5-8).

In U.S. Pat. No. 4,319,924 and its divisional case U.S. Pat. No.4,381,323, Collins, Lowe and Klotz disclose similar compositions, but with the improvement of a lower temperature cure effected by additions of diethanolamine and the use of dissolved aluminum as part of the chromate/phosphate solution. The '924 patent suggests ways of selecting pigment material by size; particle shape is not disclosed, but use of terminology such as "aluminum metal powder, −400 mesh" indicates that atomized powder is being used in the compositions.

In U.S. Pat. No. 4,537,632, Mosser discloses the use of inert gas atomized spherical powder in chromate/phosphate coating compositions. The patent shows that improved corrosion resistance and erosion properties are imparted to coating films by selecting as a pigment spherical aluminum powder having an average equivalent spherical diameter of not larger than 4 microns.

Use of atomized aluminum powder is described in U.S. Pat. No. 4,544,408, Mosser and Eddinger, which also includes a monoprotic acid and bohemite alumina to produce thixotropic chromate/ phosphate coatings.

Similar atomized aluminum powder is used in U.S. Pat. No. 4,548,646, Mosser and Fabiny, which also includes certain surface active agents and silica to produce thixotropic chromate/phosphate coatings. These coatings specifically call out atomized aluminum powder preferably less than 10 microns in diameter.

Other disclosures of Mosser and McMordie, such as U.S. Pat. No. 4,617,056 and co-pending application Ser. No. 802,827, Parts Coated with Thick Coating Composition of Uni- and Polymodal Types, now U.S. Pat. No. 4,659,613 disclose the use of mixtures of large and small atomized aluminum powder having specific sizes and ratios of large to small particles. Such compositions have numerous uses such as corrosion resistant thick films and abradable seal materials.

All the aforementioned patents and disclosures disclosed the use of atomized aluminum powder, with various sizes being preferred in different applications.

In U.S. Pat. No. 3,318,716, Schuster and Baldi disclose a coating composition consisting of a leafing aluminum pigment, a liquid ethylene glycol and a specific quantity of wetting agent, said coating being heat cured to reduce much of the hexavalent chromium to trivalent chromium.

In U.S. Pat. No. 3,958,046, Baldi discloses substituting the leafing aluminum, along with sufficient wetting agent and with or without polymeric ethylene glycol, for the spherical aluminum in the formulations described in the Allen '251 patent. This can be seen in '046 column 6, line 25 to column 7, line 7. Baldi claims that the use of flake pigment as a substitute for spherical aluminum pigment contributes a significant increase in corrosion resistance, particularly in cured layers weighing not more than about 1 milligram per square centimeter. The coating is recommended for application over low temperature pack aluminide coatings out of contact with the work pieces.

In U.S. Pat. No. 4,141,760, Baldi discloses the use of the same type of flake-containing compositions as a topcoat over chromate/phosphate compositions containing atomized aluminum powder. This is described in column 10, lines 17-50. In addition, aluminum flake compositions are disclosed which may additionally contain polytetrafluoroethylene.

In U.S. Pat. No. 4,350,719, Baldi discloses the use of layers of flake aluminum coatings as described in the '760 patent used along with coating layers containing colloidal alumina, or layers containing flake aluminum with magnesium dichromate. Combinations of these layers are described as being utilized as multilayer coating systems for improved corrosion resistance and improved heat resistance.

In U.S. Pat. No. 3,671,331, Malkin et al disclose the use of a pulverulent metal in an acidic chromate solution. The pulverulent metal may be flake or powder or both and may include magnesium, aluminum, manganese and zinc and alloys of these metals. In addition, a chromate reducing agent is part of the composition. A large amount of dispersing agent can be used. Phosphoric acid and phosphates can be present in very minor amounts (column 3, lines 43-56).

Other United States patents which have been noted in a search include the following:

U.S. Pat. No. 3,779,804 to Urban discloses a process for electroding ceramic semiconductors by means of application of compositions comprising fine aluminum powder, aluminum or magnesium phosphate and chromic acid followed by baking the coated articles at elevated temperature and finally applying silver paste to the coated surface.

U.S. Pat. No. 4,487,815 to Dorsett et al discloses coated substrates having two adjacent layers one containing a hexavalent chromium component, particulate zinc plus particulate aluminum and a boric acid component and the other layer being a silica layer substantially metal free.

U.S. Pat. No. 3,754,942 to Moradian discloses a protective coating for metals comprising a micro cystalline wax, paraffinic and naphthenic oils, asphaltite, naphthenic acid, an alkali metal sulfonate, a drying oil and optional aluminum paste as pigment.

U.S. Pat. No. 3,713,904 to Bernath et al discloses a resin containing composition that also utilizes phosphoric acid, strontium chromate and another chromate source. All hexavalent chromium in the composition is chemically reduced to trivalent chromium; the trivalent chromium being reoxidized to hexavalent chromium during the curing process. The composition does not include metal powder pigments.

In U.S. Pat. No. 4,238,534 to Inchida, a coating for steel is disclosed that comprises a monobasic phosphate, a dichromate source and an oxide pigment selected from $SiO_2$, $Al_2O_3$ and $TiO_2$ along with a colloidal silica binder. The disclosed composition is heat resistant and is highly adherent to oriented silicon steel sheet.

In U.S. Pat. No. 3,687,739, Kennedy et al disclose a composite coating constituted of an undercoating and a top coating. The undercoating is constituted of a liquid containing a hexavalent-chromium (expressed as $CrO_3$) and a pulverulent metal which can be flake or powder.

U.S. Pat. No. 3,897,222 to Hood discloses a method of protecting ferrous metal articles, particularly steel bolts from corrosion by coating the fasteners with a thin film of a noble metal, such as nickel plate, followed by a second sacrificial aluminum filled layer specifically compositions described by Allen in U.S. Pat. No. 3,248,251.

U.S. Pat. No. 3,996,073 to Evans discloses insulative coatings for steel and are useful for improvements of the magnetic characteristics of the steels. The compositions comprise certain aluminum-magnesium phosphate ratios in a colloidal silica in water. Chromic acid can be included. Metal pigments are not disclosed.

A review of the aforementioned patents indicates that the majority of chromate/phosphate based compositions that utilize metallic pigmentation use atomized powder of various sizes for coatings with different properties. The references to flake coatings include in the compositions only flake material (as pigment). In certain references, both flake and atomized (or zinc dust) pigments were mixed together. The disclosed coatings were not chromate/phosphate compositions, but chromate only compositions using zinc and aluminum pigments. Use of zinc pigments is not contemplated in this invention due to high reactivity with the chromate/phosphate binder; and phosphate is an essential ingredient of the aqueous composition.

Metal powders are produced commercially in a variety of shapes and sizes. The specific manufacturing technique determines size range, distribution, shape and surface area of resulting powder.

Air-atomized grades of metal powder are produced by aspirating molten metal through a nozzle into a supersonic stream of air. The lower end of the nozzle dips into the bath of molten metal and its upper end terminates in a small orifice. When a jet of air is passed over the orifice of the nozzle it creates a suction effect, aspirating the liquid metal through the nozzle, into the airstream and disintegrating the molten stream into small, discrete particles.

When a stream of liquid is broken into individual droplets by a jet of gas, each droplet is initially flattened and elongated by the force of the gas stream. These droplets will rapidly return to a spherical shape in order to minimize surface area and surface energy. However, when some metals are atomized in air, a hard, dense oxide film forms on the liquid drop before it can relax into a sphere. This oxide shell causes the particle to solidify into the initial distorted shape of the droplet. Consequently, air-atomized aluminum powders, for example, particularly the smaller grades, are irregular in shape.

A specialized version of this process utilizes inert gases for the atomization process. Resulting powder is globular (approximately spheroidal) rather than spherical.

Other common methods of powder production include carbonyl decomposition, water atomization, hydrogen or carbon reduction of metallic oxides, and condensation of metal vapor such as the production of zinc dust. All these methods produce a distinctly three-dimensional product.

The qualitative description of particle shapes used herein follow the definition and vocabulary issued in standard 3252 of the International Standards Organization as reported in *Powder Metallurgy, Principles and Applications* of F. V. Lenel, Metal Powder Industries Federation, Princeton, N.J. (1980), under Particle Shape and Structure.

| acicular | needle shaped |
| angular | sharply edged or roughly polyhedral |
| dendritic | of branched shape |
| fibrous | having the appearance of regularly or irregularly shaped threads |
| flaky | plate like |
| granular | approximately equidimensional but of irregular shape |
| irregular | lacking any symmetry |
| nodular | of rounded irregular shape |
| spheroidal | roughly spherical |

These powders are illustrated by FIGS. 3-4, 3-5, 3-6, 3-7, 3-8, 3-9, 3-10, 3-11, and 3-12 in the above-referenced text and these Figures are included by reference.

All the above described particle shapes can be further described by average particle size, maximum and minimum particle size, particle size distribution, surface area, surface roughness, surface oxides, degree of agglomeration, etc.

To further distinguish among the described particles, a distinction can be made with respect to the three dimensions of the particles:

| Particle Type | Primary Dimensions |
| --- | --- |
| Acicular | 1 |
| Angular | 3 |
| Dendritic | 2 or 3 |
| Fibrous | 1, 2 or 3 |
| Flaky | 2 |
| Granular | 3 |
| Irregular | 3 |
| Modular | 3 |
| Spheroidal | 3 |

It can be seen that while all the described particles have three dimensions, in the case of needle-like particles, two of the dimensions are numerically small in comparison with the third dimension. Similarly, flaky particles have two primary dimensions, the third being generally extremely small.

For purposes of a group definition, all metal powders previously described—atomized, hydrogen reduced, carbonyl decomposed and all other essentially three-dimensional metallic powders are defined as three-dimensional powder.

In accordance with the invention, any powder which as defined above, has particles which have three-dimensional particles can be used, and these are used in conjunction with two-dimensional particles, typically flaky material, as will be described further below. Accordingly, the powders of the invention contain three-dimensional particles or where the particles are other than three-dimensional, they are in smaller proportion; the other component of the powder mixture is a two-dimensional particle, typically a flake.

In contrast to production of three-dimensional metal powders, metallic flake is produced by wet or dry ball milling processes. Aluminum flakes may be leafing or non-leafing in their wetting properties, while all metal flakes may have a variety of typical particle sizes and ranges. Flake pigments are primarily two-dimensional having a small thickness. Flakes have high aspect ratios; that is, the ratio of length or width to thickness is a large number. Particle sizes are not easily measured, but are estimated by measuring surface area per gram of pigment.

Paint manufacturers generally use flake pigments in coatings in preference over atomized powders. Flake pigments are excellent waterproof barriers to corrosion because of the lamellar orientation of the flakes throughout the film. In addition to barrier effects, water transmission (or vapor transmission) is decreased due to the path length necessary to pass through the coating and around the flake pigment particles. In addition to these properties, flake pigments reflect light providing for cooler surfaces that are bright and attractive.

While useful in conventional paint formulations, incorporation of flake pigments in chromate/phosphate binders causes a variety of problems. The problems relate to the water based inorganic nature of the liquid coating material and the curing mechanism of the coating. The coating cures and becomes water insoluble by a group of reactions that involve dehydration. Since flake pigments pack and overlap in a lamellar structure, water loss causes disruption of the film.

Consequently, flake-containing chromate/phosphate and chromate films made in accordance with the above referred to references are very thin with thicknesses so thin that thickness measurements are made by coating weight after curing rather than simple thickness measurements. See for instance, Baldi '046. To obtain a "thick" coating, it is necessary to perform multiple coating/curing application in which 8–10 application and cure cycles to 800° F. are employed to safely produce a coating 12–15 micrometers thick.

In work involving the invention, attempts to make a "thick" coating that could be applied in one or two coats illustrate another problem of incorporating flake pigments in chromate/phosphate coatings. Additions of flakes at levels high enough to achieve a reasonable film build were found to be impossible due to the increase in viscosity of the resulting coating, even at relatively low levels of added flake.

FIG. 1 shows how viscosity changes occur with increasing pigment level for six different aluminum powders; two are air atomized and four are flake powders. Table 1 lists the powders in FIG. 1. Each powder was dispersed in Binder A at various pigment concentrations beginning at 10 grams per 100 milliliters, then increasing the pigment concentration and evaluating the resulting viscosity. The binder material was made as follows:

| Binder A | | |
|---|---|---|
| 3,200 | ml | deionized water |
| 1,525 | gm | phosphoric acid 85% |
| 350 | gm | chromic acid |
| 300 | gm | magnesium oxide |

This binder has the following physical properties:

pH - 1.6
Viscosity - 30 cps (Brookfield LV, No. 2 spindle)
Density - 1.28 grams/cc
Weight per solids - 28.0

In all cases, the flake pigments regardless of processing type (leafing or non-leafing) follow the same curve with very high viscosities at pigment concentrations of 30 grams per 100 milliliters of Binder A. The atomized type pigments, numbers 5 and 6 show markedly less viscosity increase even at triple the pigment concentration. Average particle size of the flake did not seem to affect viscosity for the flakes tested (compare pigments numbers 2 and 3).

Figure 2:
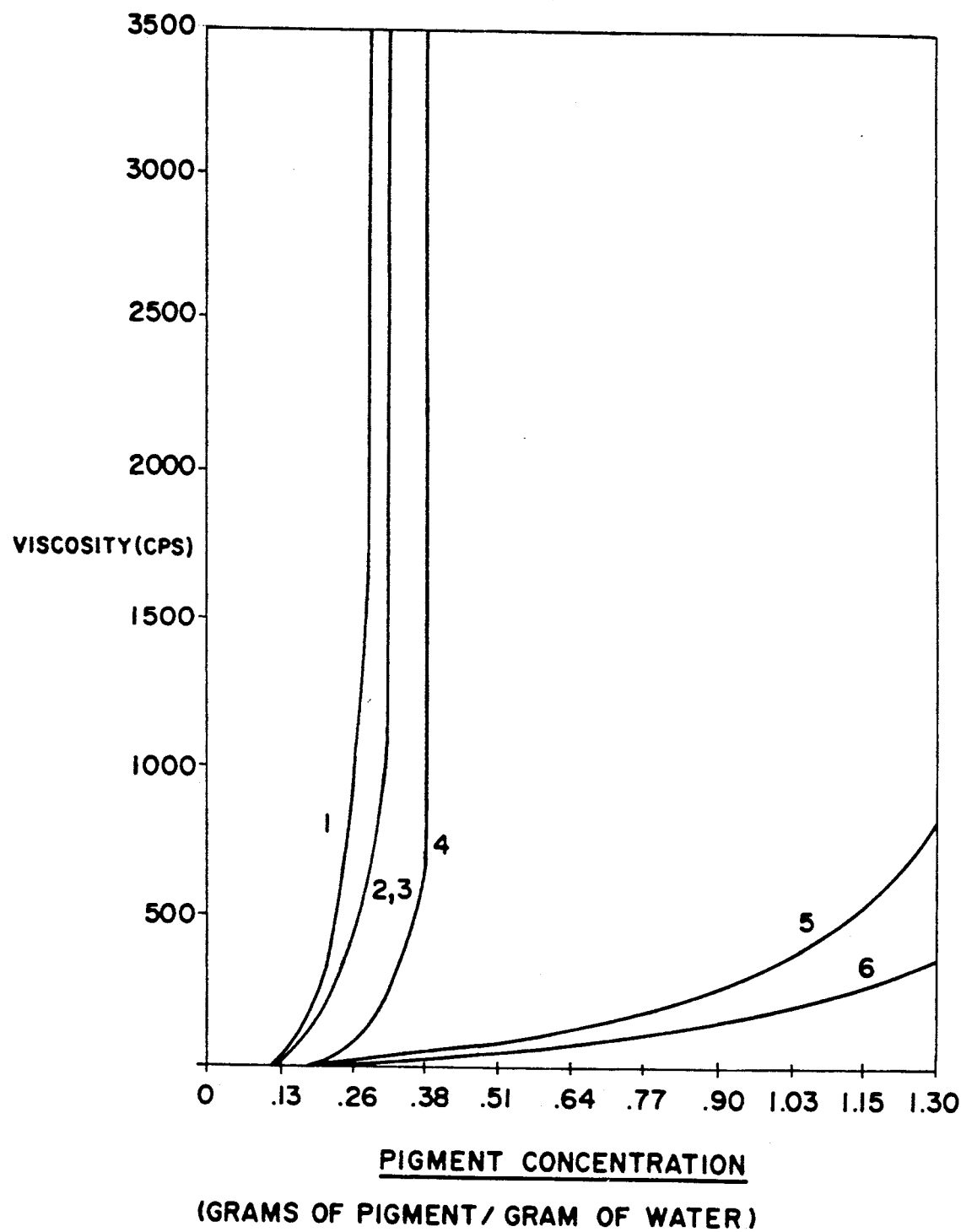
FIG. 2 is a graph showing the effect of pigment concentration on the viscosity of an acid binder in which the axis has been relabeled to show the water content of the acid binder. The added pigments, aluminum flakes and atomized powders, are identical to those shown in FIG. 1.

FIG. 2 shows the same curves, but the "x" axis has been changed to be based on flake/atomized powder concentration per unit of water available from the binder to "wet" the powder.

TABLE 1

Data for Aluminum Powders

1. Reynolds 40XD leafing flake aluminum powder; 0.1% retained on a 325 mesh screen.
2. Reynolds 4-301 non-leafing flake aluminum powder; 4.0% retained on a 325 mesh screen.
3. Reynolds 4-501 non-leafing flake aluminum powder; 10% retained on a 325 mesh screen.
4. Reynolds LSA 904 non-leafing flake aluminum paste; 0.1% retained on a 325 mesh screen.
5. Valimet H-3 spherical aluminum powder; average particle size (FSSS) 3.4 μm.
6. Reynolds LSA 693 air atomized aluminum powder; average TABLE 1-continued Data for Aluminum Powders particle size (FSSS) 4.5 μm.

It can be seen from FIGS. 1 and 2 that high viscosities are quickly achieved when flake constituents are added to chromate/phosphate binders. However, coatings with viscosities in excess of several thousand cps often need special spray equipment and techniques. In addition, as noted previously, these coatings "cure" by water loss and densely packed coatings that consist of packed flakes are very difficult to cure. Blistering is expected.

In addition, flake components are difficult to "wet" or completely disperse in the aqueous medium. As previously noted, FIG. 2 is the same graph of six aluminum powders, but with the "x" axis relabeled to show the relationship of flake or atomized powder to the amount of water available to wet the particles. Flakes have high surface areas and are difficult to "wet" or disperse in chromate/phosphate binders because the surface tension of such acid solutions exceeds 70 dynes/cm. Surface tension reduction is required if an optimum dispersion of the flakes is to be achieved. Aluminum flake powders are especially difficult to work with due to an organic film that is deposited on the surface of each flake in the manufacturing process, resulting in a high resistance to wetting in an aqueous medium, and a high tendency to generate large amounts of foam to achieve wetting.

Figure 3:
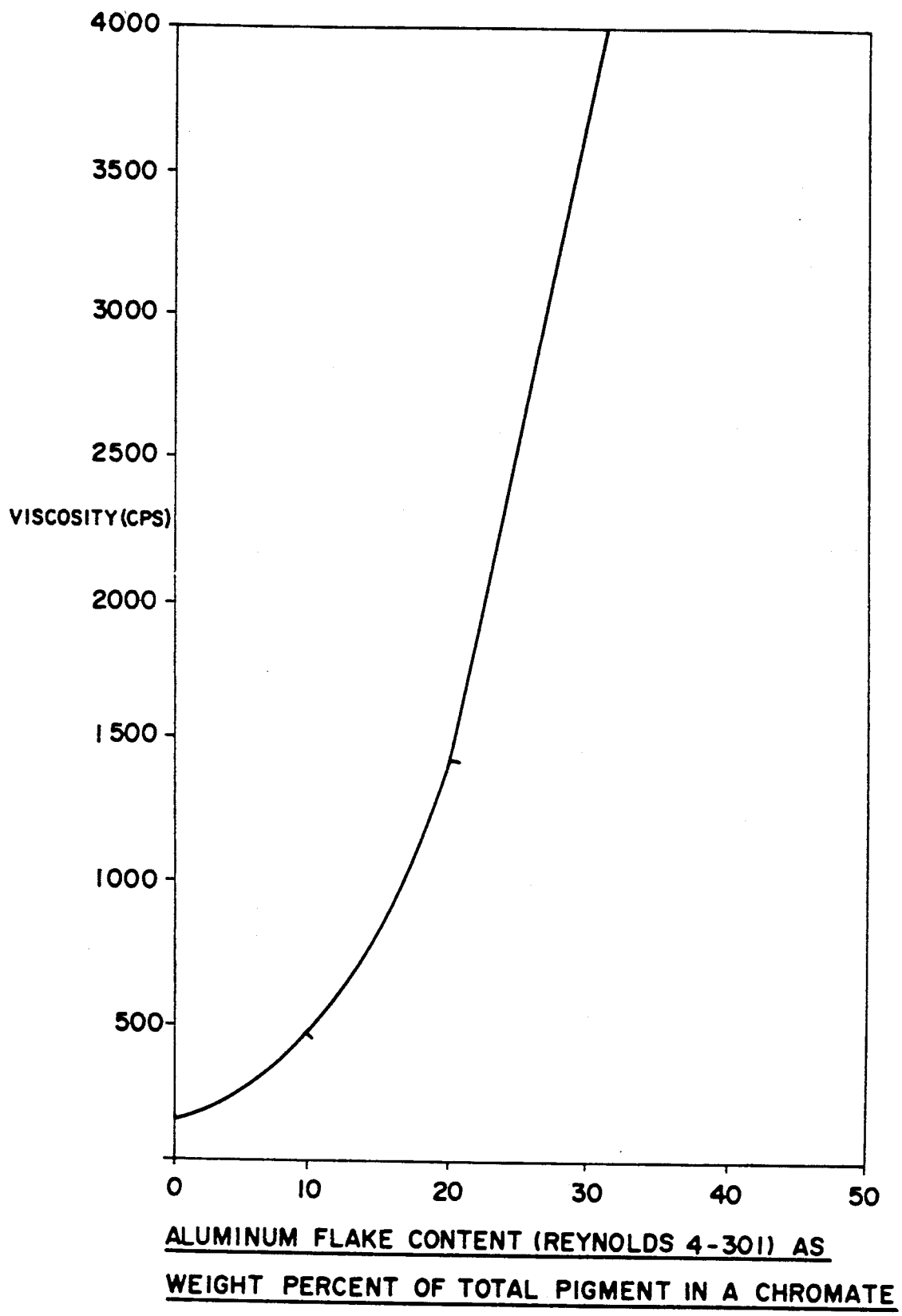
FIG. 3 is a graph showing the effect of pigment type on the viscosity of an acid binder in which total pigment concentration is held constant and flake pigment is substituted for atomized powder.
Figure 4:
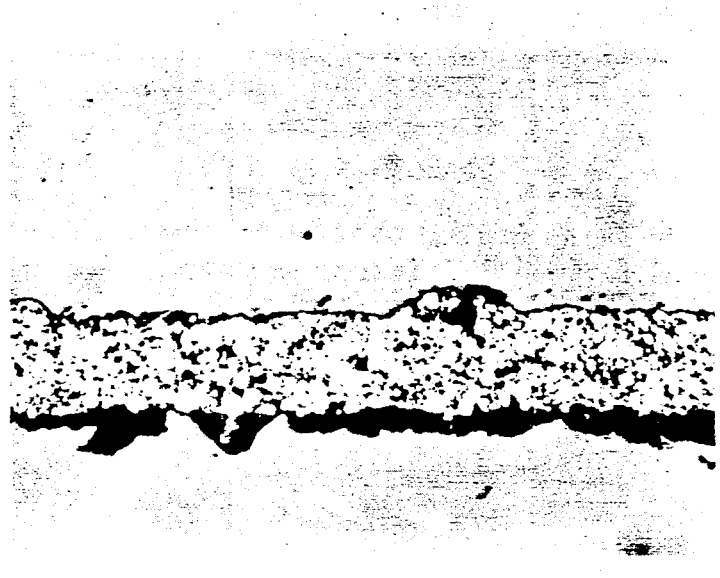
FIG. 4 is a micrograph of a coating constituted by a phosphate/chromate binder and spherical aluminum powder but no flake powder.
Figure 5:
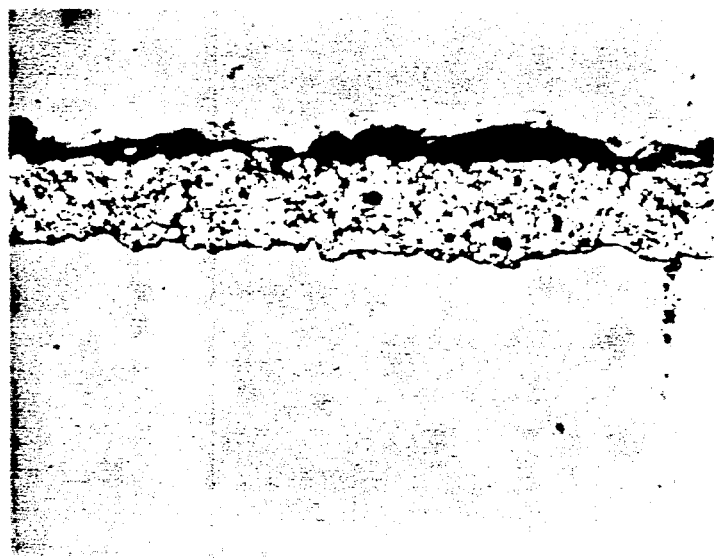
FIG. 5 is a micrograph of a coating constituted by a phosphate/chromate binder and spherical aluminum powder which contains 6 weight percent flake aluminum.
Figure 6:
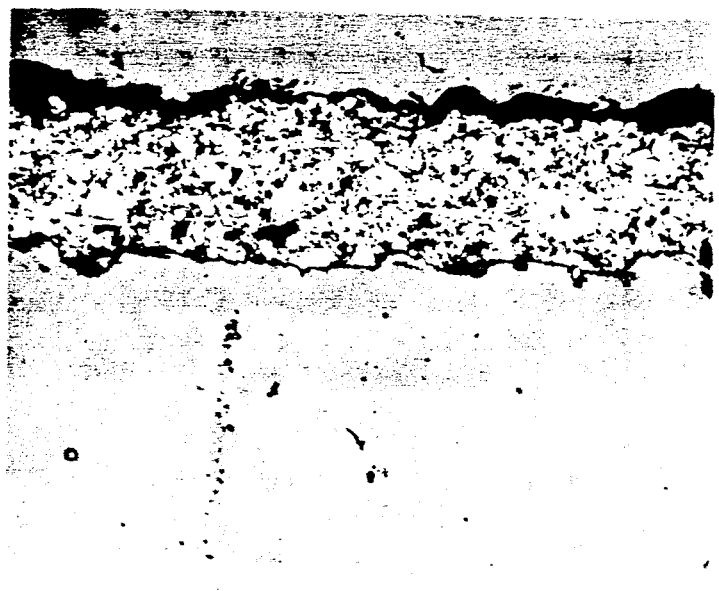
FIG. 6 is a micrograph of a coating constituted by a phosphate/chromate binder and spherical aluminum powder which contains 12.5 weight percent flake aluminum.
Figure 7:
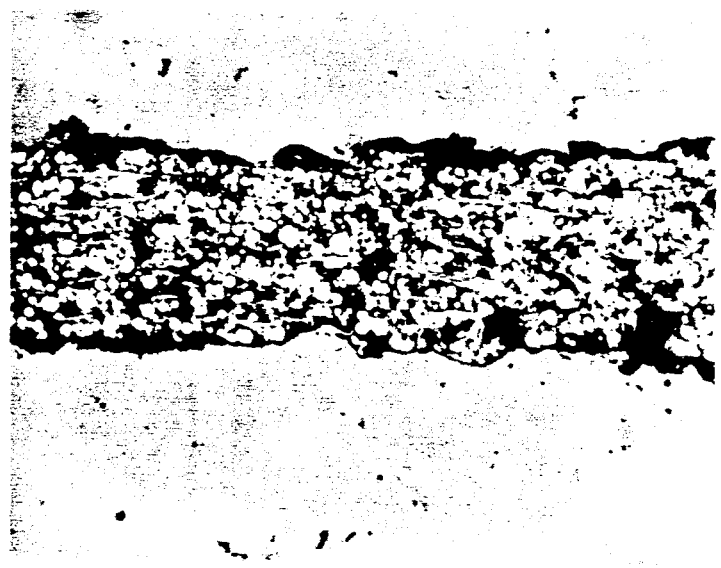
FIG. 7 is a micrograph of a coating constituted by a phosphate/chromate binder and spherical aluminum powder which contains 19 weight percent flake aluminum.
Figure 8:
FIG. 8 is a micrograph of a coating constituted by a phosphate/chromate binder and spherical aluminum powder which contains 25 weight percent flake aluminum.

FIG. 3 shows the effect of a non-leafing aluminum flake (Reynolds 4-301) on the viscosity of a chromate/phosphate binder of the invention. At about 10 weight percent, the viscosity is almost 500 cps; at 20 weight percent it is almost 1,500 cps; at higher concentration, the viscosity very markedly increases.

It is very helpful under these conditions to add a surfactant to the chromate/phosphate binder. While there are many surfactants that might provide effective wetting of the flake pigment, a combination of special properties is necessary for use in these flake coating compositions. First, the useful surfactant must be stable in the acidic chromate/phosphate binder. Most organic materials are readily oxidized by chromate (dichromate) ions at the prevailing low pH. Second, the surfactant must have a low foaming tendency or ideally, have some defoamer character. When mixing flake compositions, flakes that have not been fully "wet" tend to get trapped in any foam layer that forms above the coating liquid. This actually stabilizes the foam network, making it even more difficult to wet out the flakes.

Nonionic surfactants of the ethoxylated alkyl phenol or aliphatic alcohol family such as those known under various trademarks as Igepal, Levelene, Neutronyx, Surfonic and Triton have been found useful. In particular Triton X-100 was found to have good wetting and stability. Nonionic tertiary glycols such as Surfynol 104 are also useful. Cationic secondary and tertiary amines of the polyoxy cocamine type exemplified by Armak Ethomeen C/20 and Emery 6601 were found to be especially useful in wetting out aluminum flakes that have an oleate or stearate film deposited on the surface. Also useful were quaternary amines such as Armak Ethoquad R/13-50. Additionally, anionic surfactants of the group that includes sodium heptadecyl sulfate, sodium tetradecyl sulfate and sodium 2-ethylhexyl sulfate are usable wetting agents.

In addition to application difficulties, flake pigmented chromate/phosphate coatings have formability problems. Flake filled coatings bend poorly and are easily eroded because particles cannot effectively absorb impacts. Similar results are achieved with direct and reverse impact tests. Coating loss occurs making the coatings unsuitable for most applications.

Most metal filled chromate/phosphate coatings cited in the patent art utilize atomized aluminum powder as part or all of the pigment. Starting with the Allen '251 patent, coatings are described using 5-10 micrometer powder, that is, powder generally averaging 5-6 um in diameter. These powders are air atomized and can be purchased from a variety of sources. The powder varies slightly since each manufacturing plant produces slightly different powder. While the powder may vary slightly in particle distribution, the particle shape is similar. The powder is granular in shape with rounded shapes varying in length and size, but with no sharp edges. Coatings utilizing this general type of aluminum pigment are frequently used as anti-corrosive coatings and coatings to resist elevated temperature. Such coatings can be made galvanically active, or sacrificial by burnishing, i.e., mechanically cold working the surface of the coating or by heat treatment at about 550° C. for one hour. In each case, the coating becomes electrically conductive possibly by a combination of physical processes and chemical interaction.

The general shape of the pigment allows for some packing of the aluminum particles. The packing of the particles generally produces coatings of excellent tensile bond strength; when coating failure occurs bonding values often exceed 8,000 psi (70 MPa). Although the bond strength values are high, interstitial voids are common and vapor/moisture penetration can easily occur. This problem is less apparent in coatings made in accordance with U.S. Pat. No. 4,592,958 where small spherical powder is used in similar chromate/phosphate coatings. Bond strengths are very high, packing is such that little moisture penetration occurs and corrosion is minimized.

Coatings utilizing both types of atomized powder are easily formed and have excellent erosion resistance against particle impact. After this invention was made, it is now thought that the improved properties appear to be due, in part, to the three-dimensional particle shape which allows impacts to be absorbed or transmitted from particle to particle within the chromate/phosphate matrix.

In some situations in which coatings are made in accordance with the teachings of these reference patents particularly when utilizing these coatings for dip/spin coating application, there remain areas on coated parts in which coverage is incomplete or quite variable in thickness. An example is a fine machine screw thread. Coating tends to build in the root of the thread and accumulate also at the crest of the thread. The line between these points can often be bare. This becomes an increasingly serious problem when surface preparation is minimal and consists only of alkaline cleaning or pickling. Such variation in coating thickness is related to the forces produced during the dip/spin process. Under high shear conditions, the coating viscosity decreases because of its thixotropic or pseudoplastic nature and the pigment, being of rounded shape, migrates to the roots or crests where it builds up. This effect can easily be seen in coatings using air atomized aluminum as pigment and also applications using inert gas atomized aluminum as pigment.

It has been found, in accordance with the invention, that by the addition of flake aluminum powder in addition to the atomized aluminum powder improved coverage results and coating performance improves. In particular, non-leafing flake aluminum powder has been shown to perform well in these compositions. In these applications, the flake pigment, being flat, does not move under the dip/spin applied stress resulting in more coating uniformity and no bare areas along the thread pitch.

It was expected that the addition of flake aluminum, particularly non-leafing flake aluminum, would have a detrimental effect on the coating composition by decreasing pigment packing density and consequently lower the corrosion resistance. However, in spite of the random distribution of the flakes amongst the three-dimensional (e.g. spheroidal) pigments, the coatings obtained in accordance with the invention were found to be more uniform in coating thickness and as a result show improved corrosion resistance because of elimination of bare areas. A series of these test coatings is described in Examples 12 through 16.

The unexpected improvement in applicability and resulting coating uniformity in dip/spin application is surprising in that disruption of particle packing effects was also expected. These disruptive effects do tend to appear as flake content of the coating composition increases, but are not a severe problem until flake content is dramatically increased.

In addition to the improved uniformity of the applied films, the films are often thinner per coat than if the coatings contained only three-dimensional powder. Films have erosion resistance similar to coatings that include only three-dimensional powder and have good formability.

Part of the improved corrosion resistance seen with coatings of the invention are a result of more complete coating coverage; however, additional corrosion protection seems to be related also to the lamellar structure of the flakes. This plate-like deposition of flakes among three-dimensional pigment particles increases the length of the path required for moisture or vapor to permeate the coating and reach the substrate.

Additionally, as shown in FIGS. 1 and 2, the increase in viscosity of flake-only chromate/phosphate compositions was shown. It is further seen in FIG. 3, that by mixing the flake and atomized spheroid pigments it is possible to produce controlled viscosity increases. A 10% flake addition will produce a 500 centipoise viscosity coating, etc.. This allows for high/low or designed viscosities to be built into coating composition without having to use additives such as gums and other polymers.

It has been found that the concept is not only applicable to atomized aluminum powder/aluminum flake pigment mixtures, but other metallic pigments can be used in conjunction with a wide variety of flake materials described hereinafter.

In accordance with the invention, the coating composition of the invention comprises an acid binder which comprises phosphate ions and ions from the group of chromate and molybdate and pigments previously described and further described hereinafter.

The acid binder is an aqueous liquid having a pH less than about 4.0. While various organic solvents may be included to improve wetting of pigments and other physical properties, and to act as co-solvents, the binder is primarily water based.

The phosphate ion can be supplied from a variety of sources including phosphoric acid solutions and other materials such as phosphate salts of metals including monobasic, dibasic and tribasic salts. These salts can be used in conjunction with phosphoric acid to produce acid phosphate solutions. Other anhydrides or compounds that produce phosphate in solution can be used such as phosphorous pentoxide, metaphosphorous acid, phosphorous acid and hypophosphorous acid. Phosphorous acid and hypophosphorous acid produce phosphate ion in these binders by reaction with oxidizing agents such as hexavalent chromium in solution.

In addition to phosphate ion, the binders include hexavalent chromium in solution. While describing this form of chromium as chromate, it is to be understood that under acid conditions the ion is probably better described as a dichromate. The term "chromate" is used by convenience. The chromate in solution may be supplied by chromic acid or metal chromate or dichromate. Alternatively, molybdate ion can be used. The ion can be supplied from molybdenum trioxide or metallic molybdates.

In addition to phosphate and chromate or molybdate, metal ions may be dissolved in the binder. Divalent and trivalent ions are most suitable for inclusion in the compositions, but compositions containing no metal ions can be used as well as monovalent ions. Ratios of phosphate to chromate or molybdate in solution can be very wide. The addition of chromate especially produces a binder material that is amorphous when thermally cured and less brittle than a phosphate only binder. In general, molar ratios of $PO_4$ to $CrO_4$ will be between 1 and 4 to 1.

The binder portion as previously described is combined by high speed mixing or simple stirring with the pigment portion. As noted, the pigment portion comprises a mixture of pigments, one pigment being a flake pigment, the other generally being spherical or spheroid. The usable pigments for the invention include most metals and their alloys. Materials of special interest for the invention are:
  steel powder (low alloy)
  stainless steel powder
  copper powder, copper alloy powder
  cobalt powder
  tin powder
  tungsten powder
  molybdenum powder
  tantalum powder
  titanium and its alloys powders
  zirconium and its alloys powders
  transition metal carbide powders
  beryllium powder
Of particular interest are the following:
  spherical nickel powder
  silver coated nickel powder
  spherical atomized aluminum powder
  air atomized aluminum powder
  atomized aluminum alloy powder
  iron powder (hydrogen reduced from oxide)
  silicon powder
  silver powder
  nickel and nickel based alloy powders
  refractory metal powders A list of flake materials suitable for the invention includes:
  aluminum powder, non-leafing flake
  aluminum powder, leafing flake
  nickel flake—such as Novamet HCA1
  nickel fine flake
  stainless steel flake
  steel flake
  copper/nickel flake
  mica and chemically treated mica based pigments
  micaceous iron oxide Use of zinc flake, zinc dust, or magnesium metal powder is not contemplated by this invention due to high reactivity of the powders with the binder material.

Materials and techniques useful for the practice of the present invention include those disclosed in the following U.S. Pats. Nos.: 4,532,289; 4,537,632; 4,544,408; 4,548,646; 4,564,555; 4,592,958; 4,606,967; 4,610,929; 4,617,056; and the fixture for centrifugal dip/spin coating processes for coating parts disclosed in U.S. Pat. No. 4,489,670, all of which are incorporated herein by reference.

The relative concentration of pigments to binder solids can be highly variable and still produce coating compositions having good bond strength and improved corrosion resistance. It has been found that, for example, an aluminum filled coating may have a ratio of metal powder to binder solids of 2.5 to 1; the same volume of nickel pigment will produce a weight ratio of 7.8 to 1 in to binder solids.

The following examples are illustrative of the invention and are not intended to be limiting. It is evident to one skilled in the art that the ingredients of the various compositions illustrated (e.g., their relative proportions and amounts), as well as other variables and parameters can be modified while being within the scope and contemplation of the invention.

| EXAMPLE 1 Binder I | | |
|---|---|---|
| 731 | ml | Deionized water |
| 187.25 | ml | 85% phosphoric acid |
| 103.63 | gm | Chromic acid |
| 21.1 | gm | Magnesium oxide |
| 66 | gm | Magnesium carbonate |
| Coating composition: | | |
| 272 | ml | Binder I |
| 106 | ml | Deionized water |
| 0.2 | ml | Potassium Perfluoroalkyl Sulfonate, FC-95 (3M Company) |
| 288 | gm | Spherical aluminum powder, average equivalent spherical diameter, $\overline{ESD}$, 3.4 μm |
| 41 | gm | Non-leafing aluminum flake powder, Reynolds 4-301 |

The coating was mixed by blending the ingredients using an Osterizer blender. The aluminum flake content is 12.5% of the total pigment. Sample Tek fasteners were coated with two coats of the composition by the dip/spin method and cured at 650° F. These fasteners exhibited superior salt spray corrosion resistance when alumina grit burnished to make the coating electrically conductive.

EXAMPLE 2
Binder II

| | | |
|---|---|---|
| 805 | ml | Deionized water |
| 220 | ml | 85% phosphoric acid |
| 92 | gm | Chromic acid |
| 60.5 | gm | Magnesium oxide |

A coating composition was prepared by blending the following ingredients:

| | | |
|---|---|---|
| 200 | ml | Binder II |
| 5 | ml | Surfactant, Niaproof 08 (Niacet Corporation) |
| 162 | gm | Aluminum powder, spherical, average equivalent spherical diameter 3.4 μm |
| 18 | gm | Aluminum flake powder, Reynolds 40XD |

The coating composition was applied by the dip/spin method to several types of steel fasteners. When sectioned and examined using a metallograph, the coating appeared to be uniform in thickness on both the threads and the shank of the fastener.

EXAMPLE 3

The following composition was prepared by mixing the ingredients in order and stirring for 15 minutes.

| | | |
|---|---|---|
| 200 | ml | Binder II |
| 50 | ml | Deionized water |
| 0.2 | gm | Surfactant, Surfynol 104 (Air Products & Chemicals Inc.) |
| 175 | gm | Aluminum powder, air atomized, average particle size 16 μm (FSSS) |
| 25 | gm | Non-leafing aluminum flake powder, Reynolds 4-591 |

Mild steel test panels were coated by spray applying two coats of the composition and curing each coat at 340° C. for about 30 minutes.

To evaluate the performance of the coating, sample steel panels utilizing the Example 3 composition were compared with steel panels coated with a similar composition not including the flake component. Testing was done by immersion in a 5% sodium chloride solution which was modified by the addition of 1 weight percent of 30 percent hydrogen peroxide. This test method is known as the Machu test (Machu W, Schiffmann L and Hudson JC "Uber ein neues Kurzzeit-Korrosionprufoverfahren fur phosphatierte bzw, chromatierte, mit Anstrichen versehene Verzinkte Eisenbleche". Metalloberflaeche, Vol 9, 1968 pg. 274–277). After 16 hours of immersion, panels coated with the composition showed 50% less corrosion than similar specimens without the flake addition.

EXAMPLE 4
Binder IV

| | | |
|---|---|---|
| 852.5 | ml | Deionized water |
| 22.3 | gm | Magnesium oxide |
| 54 | gm | Chromic acid |
| 94.6 | ml | 85% phosphoric acid |
| Coating composition: | | |
| Part 1: | | |
| 170 | ml | Binder IV |
| 54 | gm | Spherical aluminum powder, $\overline{ESD}$ 5 μm |
| 6 | gm | Non-leafing aluminum flake powder Reynolds 4-591 |
| 1 | ml | Polyoxyethylene cocamine surfactant, Ethomeen C/20 (Armak Chemicals) |
| Mix by high speed dispersation. | | |
| Part 2: | | |
| 170 | ml | Binder IV |
| 20.5 | gm | Strontium chromate |
| Ball mill 4 hours. | | |

The coating composition was prepared by mixing equal volumes of PART 1 and PART 2. When spray applied to cold rolled steel test panels and cured at 600° F., the coating showed outstanding performance when tested in a Copper Accelerated Acetic Acid Salt Spray Test (CASS) per ASTM B368. Use of leachable chromate additions to chromate/phosphate based coating compositions is described in pending patent application Ser. No. 777,228 of Sept. 19, 1985, now U.S. Pat. No. 4,889,558, which is incorporated herein by reference.

EXAMPLE 5
Binder V

| | | |
|---|---|---|
| 360 | gm | 85% phosphoric acid |
| 89.3 | gm | Chromic acid |
| 70.4 | gm | Magnesium oxide |
| Vol. to 1 Liter | | Deionized water |
| Composition: | | |
| 100 | ml | Binder V |
| 150 | gm | Nickel powder, Alcan #123 |
| 16.7 | gm | Leafing nickel flake powder, Novamet, INCO Selectric Surfaces Inc. |
| 2.66 | gm | Fumed silica, Cab-O-Sil M5 |
| 0.1 | ml | Nonionic surfactant, Triton X-100, Rohm & Haas |

The coating was blended for 10 minutes in a high speed mixer.

The coating was applied to stainless steel automotive bushings where it acted as a high temperature anti-fretting coating. The flake component acts to promote uniform coating thickness and the atomized powder portion is compressible under the clamping load.

EXAMPLE 6

A coating composition which uses flake and sphere powders in a dip/spin composition with high viscosity as taught in U.S. Pat. No. 4,548,646 to Mosser and Fabiny was made according to the following formula:

| | | |
|---|---|---|
| Binder VI | | |
| 500 | ml | Deionized water |
| 27.9 | gm | Chromic acid |
| 85 | gm | 85% phosphoric acid |
| 18.73 | gm | Magnesium carbonate |
| Coating composition: | | |
| 504 | ml | Binder VI |
| 230.36 | gm | Spherical aluminum powder, $\overline{ESD}$ 3.4 μm |
| 32.91 | gm | Non-leafing aluminum flake powder, Reynolds 4-301 |
| 0.25 | gm | Potassium perfluoroalkyl sulfonate, FC-95, 3M Company |
| Blend 15 minutes using a high speed mixer. | | |
| 9.4 | gm | Fumed silica Cab-O-Sil M-5 |
| 1.2 | ml | Nonionic surfactant, 10% solution of Triton X-100 |
| Stir 10 minutes. | | |

The coating was applied to degreased, grit blasted self tapping fasteners by the dip/spin method. When tested in 5% salt spray, the coating exhibited superior corrosion resistance to similar coatings that did not contain the aluminum flake/sphere combination, i.e., contained only the spherical powder.

| EXAMPLE 7 | | |
|---|---|---|
| 200 | ml | Binder II |
| 4 | ml | Anionic surfactant, Emphos PS 21A, Witco Chemical Company |
| 4 | ml | Diacetone alcohol |
| 24 | gm | Leafing aluminum flake powder, Reynolds 5XD 90% minus 325 mesh |
| 16 | gm | Spherical aluminum powder, $\overline{ESD}$ 3.4 μm |

The coating composition was spray applied to test panels which had been previously coated with a composition similar to Example 7 of U.S. Pat. No. 3,248,251 to Allen. All of the coatings were cured at 650° F. After 48 hours immersion in a Machu test, only a few very small pinholes of red rust were observed on the surface of the coating.

| EXAMPLE 8 Binder VIII | | |
|---|---|---|
| 328 | ml | Deionized water |
| 78.35 | ml | 85% phosphoric |
| 23.68 | gm | Chromic acid |
| 25.75 | gm | Magnesium oxide |
| 4.5 | gm | Aluminum hydroxide, dried gel |
| Coating composition: | | |
| 200 | ml | Binder VIII |
| 100 | gm | Atomized aluminum powder average particle size (FSSS) 16 μm |
| 45 | gm | Spherical aluminum powder average particle size (FSSS) 3.5 μm |
| 10.14 | gm | Non-leafing aluminum flake powder |
| 0.12 | gm | Nonionic surfactant, Surfynol 104, Air Products & Chemicals Company |

This composition represents the addition of a non-leafing aluminum flake powder to a thick coating composition of the type described in U.S. Pat. No. 4,617,056 to Mosser and McMordie. When tested in the Machu test on steel panels, this composition showed excellent resistance to moisture permeation.

| EXAMPLE 9 | | |
|---|---|---|
| | | Binder IX |
| 3,200 | ml | Deionized water |
| 1,525 | gm | Phosphoric acid, 85% |
| 350 | gm | Chromic acid |
| 300 | gm | Magnesium oxide |
| Composition 9A | | |
| 385 | gm | Binder IX |
| 430 | gm | Atomized aluminum powder, $\overline{ESD}$ 36 μm |
| 110 | gm | Atomized aluminum powder, $\overline{ESD}$ 5.5 μm |
| Mix using high shear mixer for 15 minutes. | | |
| Composition 9B | | |
| 385 | gm | Binder IX |
| 430 | gm | Atomized aluminum powder, $\overline{ESD}$ 36 μm |
| 110 | gm | Atomized aluminum powder, $\overline{ESD}$ 5.5 μm |
| 1 | ml | Anionic surfactant, Niproof 08 |
| 25 | gm | Non-leafing aluminum flake powder, Reynolds 4-301 |

Composition 9A represents a coating similar to Example 7 of U.S. Pat. No. 4,617,056 to Mosser and McMordie except that the thickening ingredients were excluded. Composition 9B is the same coating with the addition of a non-leafing aluminum flake powder and a suitable surfactant. Sixteen hours after mixing the viscosity of the 9A, composition was 420 cps while 9B was 2,200 cps, using a Brookfield LV viscometer and a #3 spindle at 30 rpm. On standing for two weeks, the 9A composition had settled with a densely packed layer of pigment on the bottom of the container. The 9B composition also had a settled pigment layer. However, it could be redispersed very easily.

| EXAMPLE 10 | | |
|---|---|---|
| 295 | ml | Binder IX |
| 283 | gm | Atomized aluminum powder, $\overline{ESD}$ 4.5 μm |

The ingredients were mixed for 15 minutes using high speed dispersation. The viscosity of the resulting composition was 830 cps using a Brookfield Helipath Viscometer with a T-C spindle.

To the above composition the following ingredients were admixed:

| 75 | ml | Binder IX |
|---|---|---|
| 75 | gm | −325 mesh Mica powder, Martin Marietta 325 HK |

The viscosity of the resulting composition was 1,328 cps. This composition represents a coating that is useful in providing a corrosion resistant basecoat on steel parts by either spray application or dip/spin techniques.

| EXAMPLE 11 | | |
|---|---|---|
| 380 | ml | Binder IX |
| 280 | gm | Atomized aluminum powder, $\overline{ESD}$ 4.5 μm |
| 190 | gm | Non-leafing nickel flake powder, Novamet fine grade |
| 0.5 | ml | Anionic surfactant, Niaproof 08 |

This composition was mixed using a high shear mechanical mixer for 15 minutes, then poured through a 325 mesh screen.

This composition was used as a high temperature corrosion resistance coating on steel in which the presence of the nickel flake served as an "in situ" barrier to diffusion of the aluminum pigment into the steel substrate at temperatures exceeding 1,200° F.

The composition was applied to alloy steel turbine cases which were exposed to an operating temperature of 600° C. The coating functioned very satisfactorily.

| EXAMPLE 12 Binder XII | | |
|---|---|---|
| 373 | gm | 85% Phosphoric acid |
| 92 | gm | Chromic acid |
| 75 | gm | Magnesium oxide |
| Vol. to 2,000 ml | | Deionized water |
| Coating composition: | | |
| 200 | ml | Binder XII |
| 160 | gm | Aluminum powder, spherical, average equivalent spherical diameter 3.4 μm |

The above mixture was processed under high shear conditions for 5 minutes and spray applied to aluminum oxide blasted steel panels, dried at 80° C. for 15 minutes then cured at 300° C. for 30 minutes.

EXAMPLE 13

| | | |
|---|---|---|
| 200 | ml | Binder XII |
| 0.10 | gm | Surfactant-potassium perfluoroalkyl sulfonate |
| 150 | gm | Aluminum powder, spherical as Example 12 |
| 10 | gm | Aluminum flake, non-leafing, Reynolds 4-301 |

The coating was processed as Example 12, then the flake component was added and mixed by slow stirring. It was applied and cured as Example 12.

EXAMPLE 14

As Example 13 but with 20 grams of flake powder and 140 grams of spherical powder for a total of 12.5% flake based on metal pigment.

EXAMPLE 15

As Example 13 but with 30 grams of flake powder and 130 grams of spherical powder for a total of 18.8% flake based on metal pigment.

EXAMPLE 16

As Example 13 is repeated but with 40 grams of flake powder and 120 grams of spherical powder for a total of 25% flake based on metal pigment.

GLOSSARY

In accordance with the invention, the term "metal flake" is intended to exclude zinc and magnesium.

The term "refractory" is intended to include the following metals: a carbide or a nitride of boron, silicon or titanium. Others are disclosed in the literature and in U.S. Pat. No. 4,537,632, which is incorporated herein by reference.

The terms "unimodal powders" and "bimodal powders" mean the powders as defined in U.S. Pat. No. 4,617,056, which is incorporated by reference.

The term "completely dispersed" or "wet" (or "wetted") means "well" dispersed or "virtually all" dispersed in the aqueous acidic medium or binder. Any means to accomplish this objective may be used including an organic solvent in small proportion, i.e. less than 50 and generally less than 15 or 10 volume percent of the aqueous binder.

The claims are intended to include by the doctrine of equivalence subject matter which is within the spirit and concept of the invention though the subject matter may not be within the literal wording thereof.

Obviously, many modifications and variations of the present invention are possible for one of average skill in the art in the light of the above teachings. It is, therefore, to be understood that within the scope of the appended claims, the invention may be practiced otherwise than as specifically described.

We claim:

1. A cured phosphate coating of improved uniform coating thickness and coverage, erosion resistance, impact resistance, bond strength and corrosion resistance, which coating comprises (a) an aqueous acid binder which comprises phosphate ions and ions selected from the group consisting of chromate and molybdate ions and binds (b) a mixture which contains powder of spherical particles, and flakes in a random distribution amongst the particles, wherein said flakes constitute at least about one percent by weight of the mixture, with the proviso that neither the powder nor the flake is zinc or magnesium and that the phosphate ions are present in major proportion and in excess of the ions selected from the group consisting of chromate and molybdate.

2. The cured phosphate coating of claim 1 wherein the powder of spherical particles and the flakes are metals or alloys thereof.

3. The cured phosphate coating of claim 2 wherein the metal flakes are selected from the group consisting of aluminum, nickel, iron and the alloys thereof and copper-nickel alloy.

4. The cured phosphate coating of claim 2 wherein the powder spherical particles are metal particles which are selected from the group consisting of aluminum, nickel, silver, reduced iron, a refractory metal and the alloys thereof and wherein the flakes are metal flakes selected from the group consisting of aluminum, nickel, iron and the alloys thereof and copper-nickel.

5. A substrate coated with a cured phosphate coating of claim 2.

6. The cured phosphate coating of claim 1 wherein the weight ratio of phosphate to chromate is greater than from about 2 to 1.

7. A substrate coated with a cured phosphate coating of claim 6.

8. The cured phosphate coating of claim 2 wherein the mixture of spherical particles and flakes is in a ratio in the range of about 1 to about 65 percent by weight of the mixture.

9. A substrate coated with a cured phosphate coating of claim 8.

10. The cured phosphate coating of claim 1 wherein in the binder, the ions selected from the group consisting of chromate and molybdate, are molybdate ions only.

11. A substrate coated with a cured phosphate coating of claim 10.

12. The cured phosphate coating of claim 1 wherein the weight percent of flake to total powder-flake mixture is between about 1 to about 30 percent.

13. A substrate coated with a cured phosphate coating of claim 12.

14. The cured phosphate coating of claim 1 wherein the binder in addition to the chromate ions, also contains leachable chromate.

15. A substrate coated with a cured phosphate coating of claim 14.

16. The cured phosphate coating of claim 1 wherein the powder particles are spheroidal or spherical.

17. A substrate coated with a cured phosphate coating of claim 16.

18. The cured phosphate coating of claim 1 wherein the flake is a non-leafing aluminum flake.

19. The cured phosphate coating of claim 1 wherein the powder is a bimodal powder.

20. The cured phosphate coating of claim 1 wherein the powder is a unimodal powder.

21. The cured phosphate coating of claim 1 wherein the powder is air-atomized aluminum.

22. The cured phosphate composition of claim 1 wherein the flake is Reynolds 4-301 aluminum flake.

23. A substrate coated with a cured phosphate coating of claim 1.

24. The coated substrate of claim 23 wherein the substrate is a metal part.

25. The coated substrate of claim 24 wherein the metal substrate is steel.

26. The coated substrate of claim 25 wherein the steel is stainless steel.

27. The coated substrate of claim 25 wherein the steel is cold rolled steel.

28. The coated part of claim 24 wherein the part is a screw-shaped part.

29. The coated substrate of claim 24 wherein the automotive part is a steel metal bushing.

30. The coated substrate of claim 24 wherein the metal part is an alloy steel turbine case.

31. The coated substrate of claim 23 wherein the substrate is a coating of a thickness of at least about 10 micrometers.

32. The coated substrate of claim 24 wherein the metal part is a steel panel.

33. The coated substrate of claim 32 wherein the steel panel is an aluminum oxide blasted steel panel.

34. The coated substrate of claim 23 wherein the substrate is a fastener.

35. The coated substrate of claim 34 wherein the fastener is a steel fastener.

36. The coated fastener of claim 34 wherein the fastener is a self tapping fastener.

* * * * *